(12) United States Patent
Tsai

(10) Patent No.: US 10,050,520 B2
(45) Date of Patent: Aug. 14, 2018

(54) CHARGE PUMP CIRCUIT AND MOTOR THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 516 days.

(21) Appl. No.: 14/948,136

(22) Filed: Nov. 20, 2015

(65) Prior Publication Data

US 2017/0063221 A1  Mar. 2, 2017

(30) Foreign Application Priority Data

Aug. 28, 2015 (TW) .............................. 104128389 A

(51) Int. Cl.

| | |
|---|---|
| *H02M 3/07* | (2006.01) |
| *H02K 11/00* | (2016.01) |
| *H02M 1/44* | (2007.01) |
| *H02K 11/20* | (2016.01) |
| *H02K 11/40* | (2016.01) |
| *H02P 27/08* | (2006.01) |

(52) U.S. Cl.
CPC .......... *H02M 3/07* (2013.01); *H02K 11/0094* (2013.01); *H02K 11/20* (2016.01); *H02K 11/40* (2016.01); *H02M 1/44* (2013.01); *H02P 27/08* (2013.01)

(58) Field of Classification Search
CPC ........ H02M 3/07; H02M 3/337; H02M 3/156; H02M 3/073; H02M 7/10; H02M 2003/077; G05F 3/16; G05F 1/52; G05F 1/56; G11C 5/145
USPC .... 363/59, 60; 323/265, 268, 273, 282, 351; 327/530, 536, 537
See application file for complete search history.

(56) References Cited

U.S. PATENT DOCUMENTS

| | | | |
|---|---|---|---|
| 8,841,891 B2 * | 9/2014 | Williams | .................. G05F 3/16 323/265 |
| 2006/0176102 A1 * | 8/2006 | Ayres | .................... H02M 3/073 327/536 |
| 2009/0039947 A1 * | 2/2009 | Williams | ................ H02M 3/07 327/536 |

(Continued)

*Primary Examiner* — Adolf Berhane
(74) *Attorney, Agent, or Firm* — Li & Cai Intellectual Property (USA) Office

(57) ABSTRACT

The present disclosure illustrates a charge pump circuit. The charge pump circuit includes an input voltage module and a switching transistor module. The input voltage module is configured for providing an input voltage. The switching transistor module is configured for receiving a supply voltage and the input voltage. There is a voltage difference between the supply voltage and the input voltage. During a first charging period, the switching transistor module charges a first capacitor, and a voltage across the first capacitor is the voltage difference. During a second charging period, the switching transistor module charges a second capacitor, and a voltage across the second capacitor is a sum of the supply voltage and the voltage difference. A frequency which the switching transistor module charges the second capacitor is higher than a frequency which the second capacitor provides voltage to a bridge circuit.

17 Claims, 8 Drawing Sheets

(56) References Cited

U.S. PATENT DOCUMENTS

| | | | | |
|---|---|---|---|---|
| 2010/0329067 A1* | 12/2010 | Lim | ............... | G11C 5/145 |
| | | | | 365/230.06 |
| 2011/0279173 A1* | 11/2011 | Singnurkar | ............. | H02M 3/07 |
| | | | | 327/536 |
| 2017/0085210 A1* | 3/2017 | Tsai | ............... | H02P 29/0241 |
| 2017/0222580 A1* | 8/2017 | Tsai | ............... | H02P 6/153 |

* cited by examiner

CHARGE PUMP CIRCUIT AND MOTOR THEREOF

BACKGROUND OF THE INVENTION

1. Field of the Invention

The instant disclosure relates to a charge pump circuit; in particular, to a charge pump circuit having a high efficiency and a motor using the same.

2. Description of Related Art

As technology develops, the motor becomes more and more an essential electric device. The common motors, such as the DC motor, the AC motor, the step motor and the like, have been widely used for driving fans.

There is usually a power supply circuit needed in the motor to provide voltages to each element of the motor. The motor changes the polarities of the motor rotator or the motor stator via the high-side bridge switch and the low-side bridge switch, which makes the motor keep operating. The bootstrap circuit and the charge pump circuit are most commonly used.

There are at least one bootstrap diode and at least one bootstrap capacitor in the bootstrap circuit, to correspondingly control the high-side bridge switch and the low-side bridge switch. If the phase number of the motor becomes more (such as a three-phase motor), there are more bootstrap diodes and bootstrap capacitors needed in the bootstrap circuit, such that the chip area and the production cost of the bootstrap circuit increase. Moreover, the working mechanism of the bootstrap circuit is related to orderly turning on the high-side bridge switch and the low-side bridge switch. In other words, the high-side bridge switch and the low-side bridge switch cannot be continually turned on via the motor using the bootstrap circuit. Therefore, the charge pump circuit is often used in the motors currently.

Please refer to FIG. 1. FIG. 1 shows a circuit diagram of a traditional charge pump circuit. The traditional charge pump circuit comprises a first transistor $M1\_1$, a second transistor $M1\_2$, a third transistor $M1\_3$, a fourth transistor $M1\_4$, a first capacitor $C1\_1$ and a second capacitor $C1\_2$. The first transistor $M1\_1$ is electrically connected to the second transistor $M1\_2$, and the first transistor $M1\_1$ receives a first supply voltage VCC1. The third transistor $M1\_3$ is electrically connected to the fourth transistor $M1\_4$, and the third transistor $M1\_3$ receives a second supply voltage VCC2. One end of the first capacitor $C1\_1$ is electrically connected between the first transistor $M1\_1$ and the second transistor $M1\_2$, and another end of the first capacitor $C1\_1$ is electrically connected between the third transistor $M1\_3$ and the fourth transistor $M1\_4$. The second capacitor $C1\_2$ is electrically connected to the fourth transistor $M1\_4$ and the output end Vo.

As the charge pump circuit operates, the first transistor $M1\_1$ and the fourth transistor $M1\_4$ are turned off, and the second transistor $M1\_2$ and the third transistor $M1\_3$ are turned on. At this moment, the current flows to the second transistor $M1\_2$ via the third transistor $M1\_3$ and the first capacitor $C1\_1$. The voltage of the first end point $N1\_1$ is zero, and the voltage of the second end point $N1\_2$ is VCC2. In other words, the first capacitor $C1\_1$ is charging till the voltage across the first capacitor $C1\_1$ reaches to VCC2. After the first capacitor $C1\_1$ has finished charging, the first transistor $M1\_1$ and the fourth transistor $M1\_4$ are turned on and the second transistor $M1\_2$ and the third transistor $M1\_3$ are turned off. At this moment, the current flows to the fourth transistor $M1\_4$ via the first transistor $M1\_1$ and the first capacitor $C1\_1$. The voltage of the first end point $N1\_1$ is VCC1, and the voltage of the second end point $N1\_2$ is VCC1 +VCC2. That is, the first capacitor $C1\_1$ is charging the second capacitor $C1\_2$ until the voltage across the second capacitor $C1\_2$ is VCC1 +VCC2.

However, the traditional charge pump circuit has several disadvantages. As the charge pump circuit operates in a high-voltage environment, the first transistor $M1\_1$, the second transistor $M1\_2$, the third transistor $M1\_3$ and the fourth transistor $M1\_4$ need to be the high-voltage elements that can withstand high voltages. For example, VCC1 is 24V and VCC2 is 5V. As the first capacitor $C1\_1$ is charging, the voltage across the first transistor $M1\_1$ and the fourth transistor $M1\_4$ is 24V according to the current direction. On the other hand, as the second capacitor $C1\_2$ is charging, the voltage across the second transistor $M1\_2$ and the third transistor $M1\_3$ is also 24V. Thus, the first transistor $M1\_1$, the second transistor $M1\_2$, the third transistor $M1\_3$ and the fourth transistor $M1\_4$ need to be the high-voltage elements to withstand the 24V voltage.

Moreover, the first transistor $M1\_1$, the second transistor $M1\_2$, the third transistor $M1\_3$ and the fourth transistor $M1\_4$ need to be the high-voltage elements having their conducting resistances. The smaller the conducting resistances are, the smaller the voltages across the first transistor $M1\_1$, the second transistor $M1\_2$, the third transistor $M1\_3$ and the fourth transistor $M1\_4$ would be. Also, the current actually provided to the first capacitor $C1\_1$ and the second capacitor $C1\_2$ would be larger. In order to decrease the conducting resistances, the areas of the first transistor $M1\_1$, the second transistor $M1\_2$, the third transistor $M1\_3$ and the fourth transistor $M1\_4$ need to increase. However, increasing the areas of the first transistor $M1\_1$, the second transistor $M1\_2$, the third transistor $M1\_3$ and the fourth transistor $M1\_4$ would not only increase the entire circuit area but also take more time to pre-drive the first transistor $M1\_1$, the second transistor $M1\_2$, the third transistor $M1\_3$ and the fourth transistor $M1\_4$, such that it becomes harder to drive the first transistor $M1\_1$, the second transistor $M1\_2$, the third transistor $M1\_3$ and the fourth transistor $M1\_4$.

SUMMARY OF THE INVENTION

The instant disclosure provides a charge pump circuit. The charge pump circuit comprises an input voltage module and a switching transistor module. The input voltage module provides an input voltage. The switching transistor module is electrically connected to a first capacitor, a second capacitor and the input voltage module. The switching transistor module receives a supply voltage and the input voltage and charges the first capacitor and the second capacitor, wherein the switching transistor module comprises a plurality of low-voltage elements and there is a voltage difference between the supply voltage and the input voltage. The switching transistor module charges the first capacitor within a first charging period such that a voltage across the first capacitor is the supply voltage. The switching transistor module charges the second capacitor within a second charging period such that a voltage across the second capacitor is the sum of the supply voltage and the voltage difference. The frequency of charging the second capacitor via the switching transistor module is higher than the frequency of discharging a bridge circuit via the second capacitor, and a high-side bridge switch of the bridge circuit is an NMOS transistor.

The instant disclosure further provides a motor, and the motor comprises a charge pump circuit and at least one bridge circuit. The charge pump circuit comprises an input voltage module and a switching transistor module. The input voltage module provides an input voltage. The switching transistor module is electrically connected to a first capacitor, a second capacitor and the input voltage module. The input voltage module receives a supply voltage and the input voltage, and charges the first capacitor and the second capacitor. The switching transistor module comprises a plurality of low-voltage elements, and there is a voltage difference between the supply voltage and the input voltage. The bridge circuit is electrically connected to the charge pump circuit, and comprises a high-side bridge switch, wherein the high-side bridge switch is an NMOS transistor. The switching transistor module charges the first capacitor within a first charging period such that a voltage across the first capacitor is the supply voltage. The switching transistor module charges the second capacitor within a second charging period such that a voltage across the second capacitor is the sum of the supply voltage and the voltage difference. The frequency of charging the second capacitor via the switching transistor module is higher than the frequency of discharging a bridge circuit via the second capacitor, and a high-side bridge switch of the bridge circuit is an NMOS transistor.

To sum up, the charge pump circuit and the motor using the same provided by the instant disclosure provides a stable voltage to the bridge circuit, such that the high-side bridge switch and the low-side bridge switch can be entirely turned on. Moreover, the charge pump circuit comprises a plurality of low-voltage elements, and the area of the charge pump circuit can be decreased. Also, switching noises generated by the charge pump circuit within the switching process can be reduced such that the operating efficiency of the motor can be raised.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
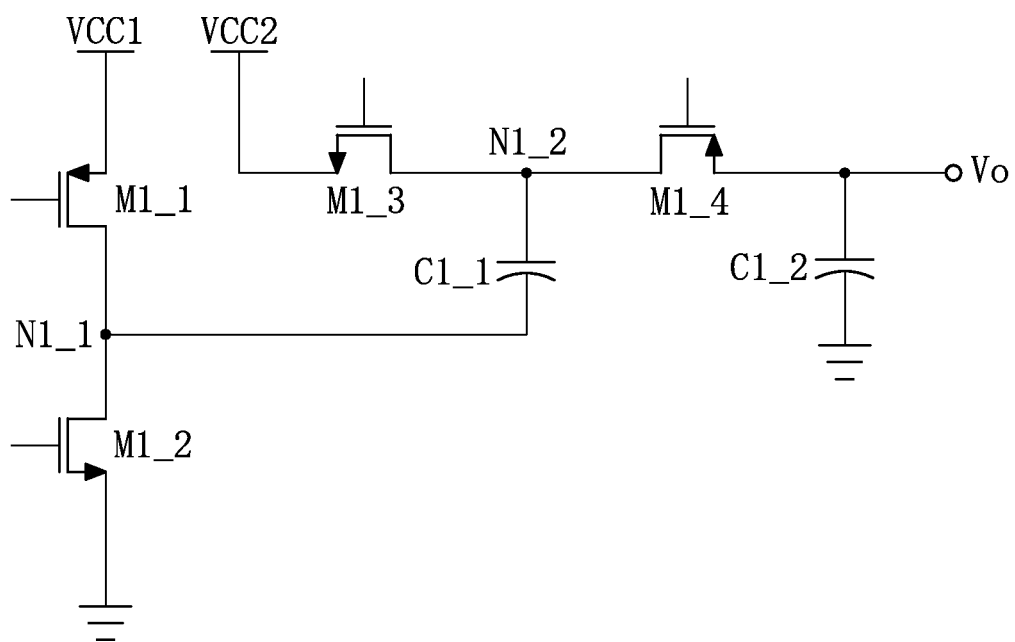
FIG. 1 shows a circuit diagram of a traditional charge pump circuit.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

Figure 2:
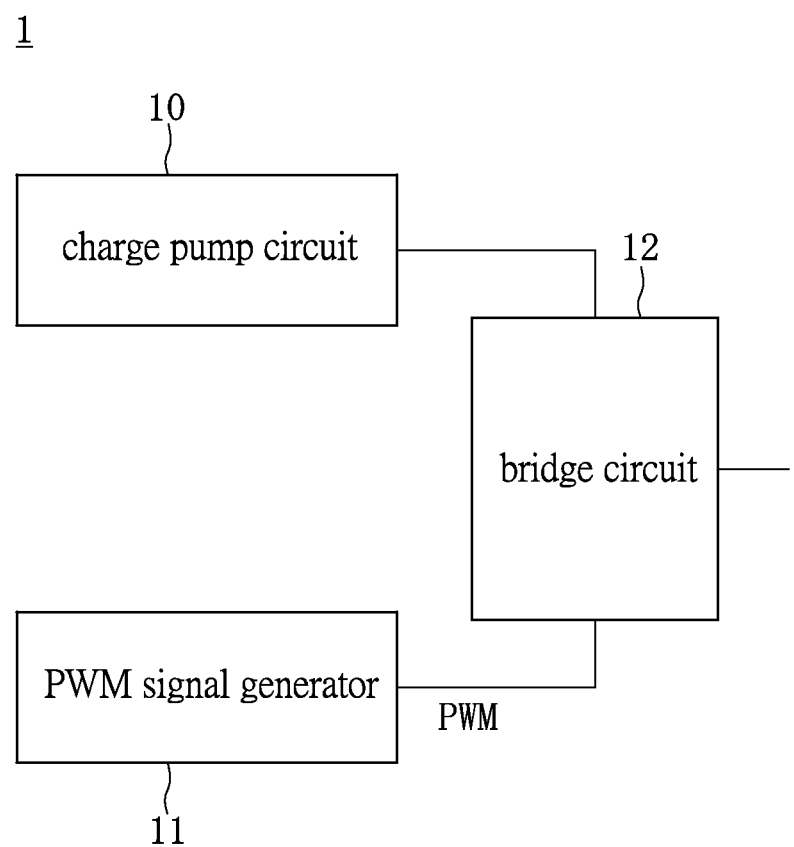
FIG. 2 shows a block diagram of a motor of one embodiment of the instant disclosure.

Please refer to FIG. 2. FIG. 2 shows a block diagram of a motor of one embodiment of the instant disclosure. The motor 1 comprises a charge pump circuit 10, a PWM signal generator 11 and at least one bridge circuit 12. The charge pump circuit 10 and the PWM signal generator 11 are electrically connected to the bridge circuit 12 respectively. The motor 1 can be a single-phase motor, a two-phase motor or a three-phase motor, and it is not limited herein. The amount of the bridge circuit 12 changes according to the phase number of the motor 1. For illustrating easily, the single-phase motor is taken for example in this embodiment, and this the motor 1 comprises one bridge circuit 12 only.

The charge pump circuit 10 comprises the proper logic, circuits and/or coding for providing a stable voltage to the bridge circuit 12. The high-side bridge switch and the low-side bridge switch (not shown in FIG. 2) of the bridge circuit 12 can be fully turned on, such that the operating efficiency of the motor 1 can be raised.

The PWM signal generator 11 comprises the proper logic, circuits and/or coding for providing a pulse width modulation signal PWM to the bridge circuit 12. The duty cycle of the pulse width modulation signal PWM can be adjusted based on need.

The bridge circuit 12 comprises the proper logic, circuits and/or coding for selectively turn the high-side bridge switch and the low-side bridge switch according to the pulse width modulation signal PWM, to change the polarity of the motor rotator (not shown in FIG. 2) of the motor 1 and thus make the motor 1 work.

Figure 3A:
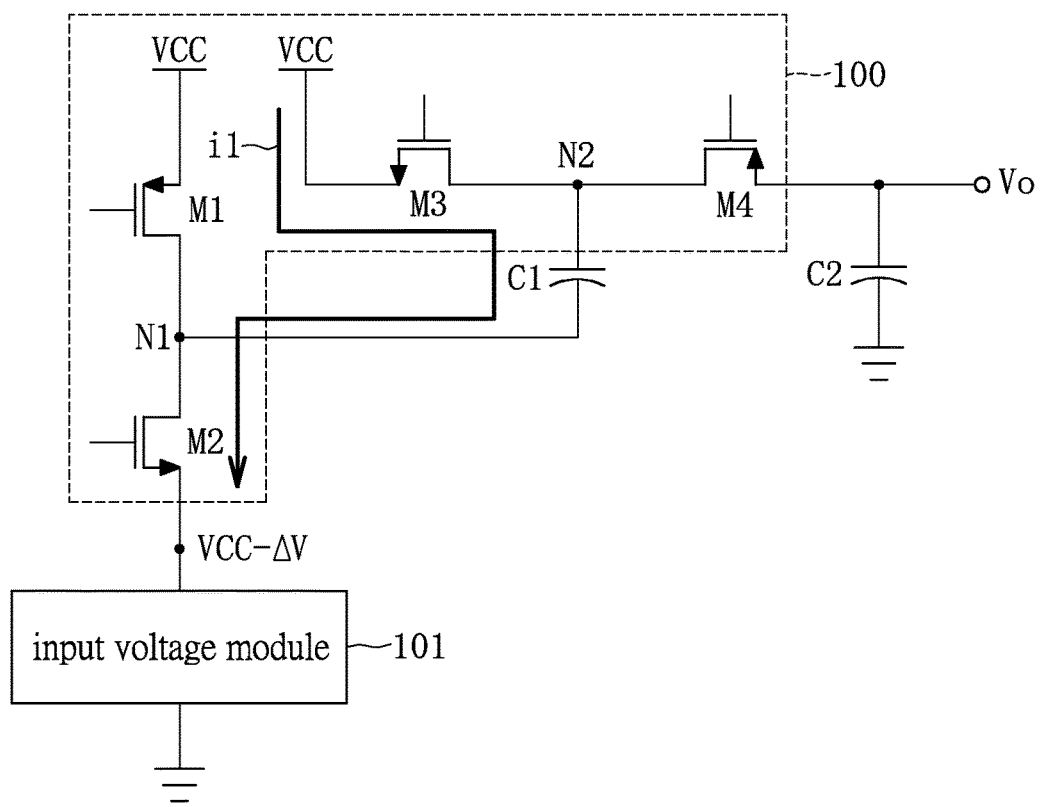
FIG. 3A shows a circuit diagram showing a charge pump circuit operating within the first charging period of one embodiment of the instant disclosure.
Figure 3B:
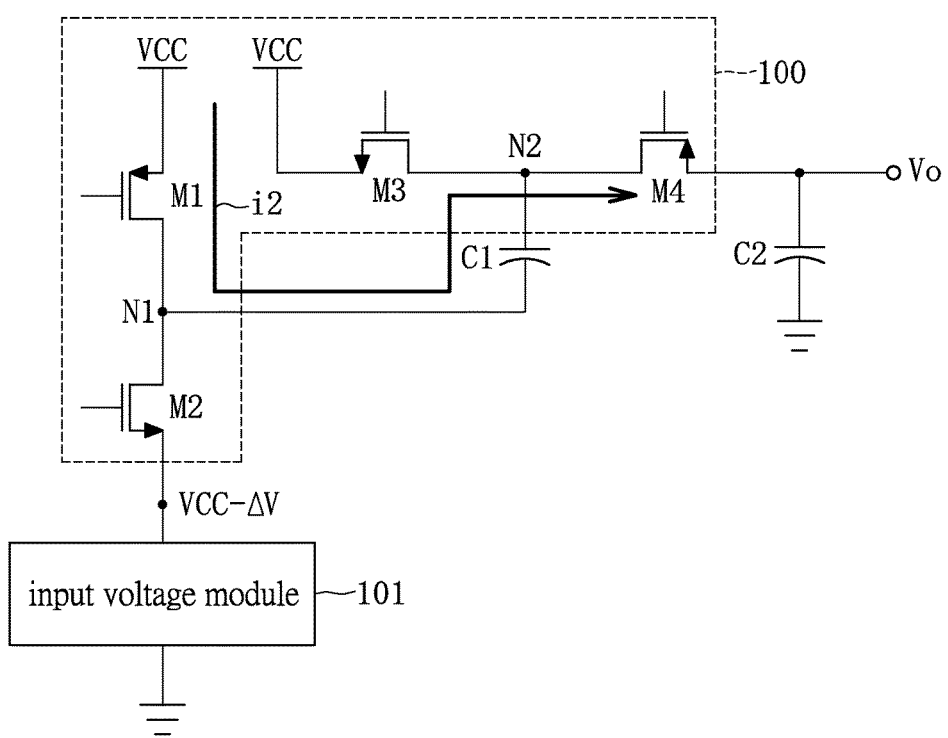
FIG. 3B shows a circuit diagram showing a charge pump circuit operating within the second charging period of one embodiment of the instant disclosure.

For further illustrating the structure and operation of the charge pump circuit 10, please refer to FIGS. 3A and 3B. FIG. 3A shows a circuit diagram showing a charge pump circuit operating within the first charging period of one embodiment of the instant disclosure. FIG. 3B shows a circuit diagram showing a charge pump circuit operating within the second charging period of one embodiment of the instant disclosure. The charge pump circuit 10 comprises a switching transistor module 100 and an input voltage module 101. The switching transistor module 100 is electrically connected to the input voltage module 101.

The switching transistor module 100 comprises a first transistor M1, a second transistor M2, a third transistor M3 and a fourth transistor M4. The first transistor M1 is electrically connected to the second transistor M2. The third transistor M3 is electrically connected to the fourth transistor M4. It is worth mentioning that, the first transistor M1, the second transistor M2, the third transistor M3 and the fourth transistor M4 are all low-voltage elements.

In this embodiment, the first transistor M1 and the fourth transistor M4 are PMOS transistors, and the second transistor M2 and the third transistor M3 are NOMS transistors; however, it is not limited herein. Those skilled in the art can design the structure of the switching transistor module 100 based on need by referring to the operation of the switching transistor module 100 illustrated as follows.

The source of the switching transistor module M1_receives the supply voltage VCC (for example, 24 V), and the drain of the second transistor M2 is electrically connected to the first end point N1. The source of the second transistor M2 is electrically connected to the input voltage module 101, and the drain of the second transistor M2 is electrically connected to the first end point N1. The source of the third transistor M3 receives the supply voltage VCC, and the drain of the supply voltage M3 is electrically connected to the supply voltage N2. The source of the fourth transistor M4 is electrically connected to the output end Vo, and the drain of the fourth transistor is electrically connected to the second end point N2. Gates of the first transistor M1, the second transistor M2, the third transistor M3 and the fourth transistor M4 are electrically connected to a controller (not shown in FIGS. 3A and 3B) respectively to receive a control signal output by the controller.

In addition, the charge pump circuit 10 further comprises a first capacitor C1 and a second capacitor C2. The first end of the first capacitor C1 is electrically connected to the first end point N1, and the second end of the first capacitor C1 is electrically connected to the second end point N2. The first end of the second capacitor C2 is electrically connected to the source of the fourth transistor M4, and the second end of the second capacitor C2 is connected to ground.

It should be noticed that, in this embodiment, the first capacitor C1 and the second capacitor C2 are configured outside the switching transistor module 100; however, it is not limited herein. In other embodiments, the first capacitor C1 and the second capacitor C2 can also be configured in the switching transistor module 100 and be integrated with the switching transistor module 100 as a chip.

The switching transistor module 100 receives the supply voltage VCC to provide a stable voltage to the first capacitor C1 and the second capacitor C2.

The input voltage module 101 comprises the proper logic, circuits and/or coding for providing the input voltage to the switching transistor module 100. There is a supply voltage $\Delta V$ (for example, 5V) between the input voltage and the supply voltage VCC. In this embodiment, the voltage of the input voltage can be represented as VCC$-\Delta V$.

Figure 4:
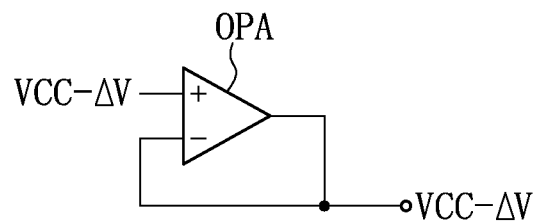
FIG. 4 shows a circuit diagram of an input voltage module of one embodiment of the instant disclosure.

Please refer to FIG. 4. FIG. 4 shows a circuit diagram of an input voltage module of one embodiment of the instant disclosure. The input voltage module 101 comprises a negative feedback amplifier OPA. The non-inverting input end of the negative feedback amplifier OPA receives a voltage which is VCC$-\Delta V$. The inverting end of the negative feedback amplifier OPA is electrically connected to the output end of the negative feedback amplifier OPA. Moreover, the output end of the negative feedback amplifier OPA is further electrically connected to source of the second transistor M2. Thereby, the input voltage module 101 can provide a voltage which is VCC$-\Delta V$ to the switching transistor module 100.

It should be noted that, in this embodiment, the non-inverting input end of the negative feedback amplifier OPA receives a voltage which is VCC$-\Delta V$; however, it is not limited herein. In other embodiments, the voltage received by the non-inverting input end can be changed based on need, such that the voltage provided by the input voltage module 101 can be suitable for the operation of low-voltage elements.

In addition, in another embodiment, the output end of the negative feedback amplifier OPA is also electrically connected to the fifth transistor (not shown in FIG. 4) to form a source follower. The fifth transistor, for example, can be a PMOS transistor. Source of the fifth transistor is electrically connected to the source of the second transistor M2, and the drain of the fifth transistor is grounded. Thereby, the current flowing within the charge pump circuit 10 cannot affect the negative feedback amplifier OPA.

The input voltage module 101 properly provides the input voltage to the switching transistor module 100. It should be noted that, the structure of the input voltage module is an example for illustration but not a limitation of the instant disclosure. In other embodiments, the input voltage module 101 can be structured differently, as long as the input voltage module 101 can provide the input voltage to the switching transistor module 100.

Again refer to FIG. 3A, within the first charging period, the first transistor M1 and the fourth transistor M4 are turned off, and the second transistor M2 and the third transistor M3 are turned on. At this moment, the voltage of the first end point N1 is VCC$-\Delta V$, and the voltage of the second end point N2 is VCC. The first current i1 flows to the second transistor M2 via the third transistor M3 and the first capacitor C1 (as shown in FIG. 3A). After that, the first capacitor C1 is charged until a voltage across the first capacitor C1 reaches to $\Delta V$.

Within the first charging period, a voltage across the first transistor M1 is VCC-(VCC$-\Delta V$). That is, the voltage that the first transistor M1 withstands is $\Delta V$. On the other hand, assuming that the second capacitor C2 has stored enough charges, this represents that a voltage across the second capacitor C2 is VCC$+\Delta V$. At this moment, a voltage across the fourth transistor M4 is (VCC$+\Delta V$)-VCC. That is, the voltage that the fourth transistor M4 withstands is also $\Delta V$.

Again refer to FIG. 3B, within the second charging period, the first transistor M1 and the fourth transistor M4 are turned on, and the second transistor M2 and the third transistor M3 are turned off. At this moment, the voltage of the first end point N1 is VCC, and the voltage of the second end point N2 is VCC$+\Delta V$. The second current i2 flows to the fourth transistor M4 via the first transistor M1 and the first capacitor C1 (as shown in FIG. 3B). After that, the second capacitor C2 is charged until a voltage across the second capacitor reaches to VCC$+\Delta V$.

Within the second charging period, a voltage across the second transistor M2 is VCC-(VCC$-\Delta V$). That is, the voltage that the second transistor M2 withstands is $\Delta V$. On the other hand, the voltage of the second end point N2 is VCC$+\Delta V$, so a voltage across the third transistor M3 is (VCC$+\Delta V$)-VCC. That is, the voltage that the third transistor M3 withstands is also $\Delta V$.

According to the above description, the first transistor M1, the second transistor M2, the third transistor M3 and the four transistor M4 should be just able to withstand the voltage $\Delta V$. In other words, the first transistor M1, the second transistor M2, the third transistor M3 and the fourth transistor M4 can be low-voltage elements but not high-voltage elements. The area of the low-voltage element is smaller than the area of the high-voltage element, so the area of the charge pump circuit 10 can be decreased.

Additionally, the first transistor M1, the second transistor M2, the third transistor M3 and the fourth transistor M4 are low-voltage elements, such that the parasitic capacitances of the first transistor M1, the second transistor M2, the third transistor M3 and the fourth transistor M4 are reduced, and thus not much time is needed to drive the first transistor M1, the second transistor M2, the third transistor M3 and the fourth transistor M4. In other words, the turn-on delay time of the first transistor M1, the second transistor M2, the third transistor M3 and the fourth transistor M4 can be decreased. Thereby, the switching frequency of the first transistor M1, the second transistor M2, the third transistor M3 and the fourth transistor M4 can be raised.

The frequency that the charge pump circuit 10 charges the first capacitor C1 and the second capacitor C2 is related to the switching frequency of the first transistor M1, the second transistor M2, the third transistor M3 and the fourth transistor M4. The raised switching frequency of the first transistor M1, the second transistor M2, the third transistor M3 and the fourth transistor M4 represents that the frequency that the charge pump circuit 10 charges the first capacitor C1 and the second capacitor C2 is also raised. Thus, a voltage across the second capacitor C2 can maintain at VCC+ΔV.

Figure 5:
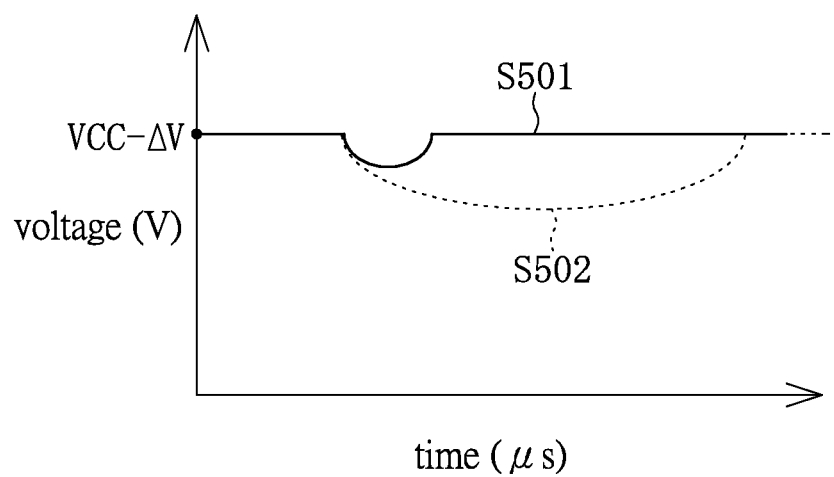
FIG. 5 shows a schematic diagram showing the voltage change of the second capacitor with respect to time in one embodiment of the instant disclosure.

Please refer to FIG. 5. FIG. 5 shows a schematic diagram showing the voltage change of the second capacitor with respect to time in one embodiment of the instant disclosure. The vertical axis in FIG. 5 represents for the voltage (V) and the horizontal axis in FIG. 5 represents time (μs). There are two curves provided in FIG. 5. The curve S501 represents the voltage change of the second capacitor C2 of the charge pump circuit 10 provided by the instant disclosure, and the curve S502 represents the voltage change of the second capacitor of a traditional charge pump circuit. It is worth mentioning that, the difference between the charge pump circuit 10 provided by the instant disclosure and the traditional charge pump circuit is that, the transistors used in the traditional charge pump circuit are high-voltage elements, but the transistors used in the charge pump circuit 10 provided by the instant disclosure are low-voltage elements.

As the second capacitor C2 discharges to the bridge circuit 12 via the output end Vo, the voltage across the second capacitor C2 starts to drop. The frequency that the charge pump circuit 10 in this embodiment charges the second capacitor C2 is high, so the voltage across the second capacitor C2 can soon return to VCC+ΔV. According to the curve S501 and curve S502, the voltage across the second capacitor C2 can return sooner to VCC+ΔV than the voltage across the second capacitor in the traditional charge pump circuit.

For example, the second capacitor C2 in this embodiment provides the voltage to the bridge circuit 12 every 50 μs. The charge pump circuit 10 charges the second capacitor C2 every 30 μs. Thereby, each time the second capacitor can provide enough voltage to the bridge circuit 12, such that the high-side bridge switch and the low-side bridge switch can be fully turned on, which increases the operating frequency of the motor 1.

On the other hand, the first transistor M1, the second transistor M2, the third transistor M3 and the third transistor M4 are all low-voltage elements, so the switching noises generated within the switching process can be reduced, which makes the motor 1 operate stably.

Figure 6:
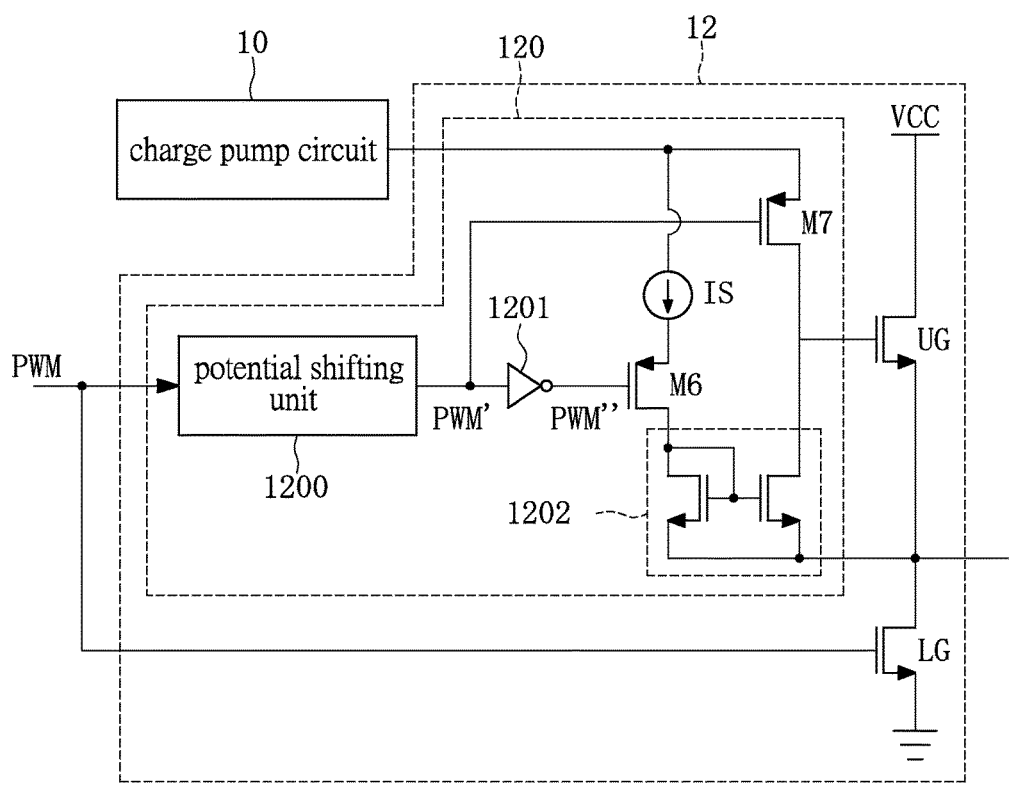
FIG. 6 shows a circuit diagram of a bridge circuit of one embodiment of the instant disclosure.

In order to more clearly illustrate the instant disclosure, please refer to FIG. 6. FIG. 6 shows a circuit diagram of a bridge circuit of one embodiment of the instant disclosure. The bridge circuit 12 comprises a high-side bridge switch UG, a low-side bridge switch LG and a switching control module 120. The high-side bridge switch UG and the low-side bridge switch LG are electrically connected to the switching control module 120 respectively. The switching control module 120 is electrically connected to the charge pump circuit 10 and a PWM signal generator (as the PWM signal generator 11 shown in FIG. 2).

The turning on or off of the high-side bridge switch UG and the low-side bridge switch LG directly affects the polarity of the motor rotator or the motor stator. In other words, the turning on or off of the motor is related to the operating status of the motor 1.

In the motor using the charge pump circuit provided by the embodiment of the instant disclosure, the high-side bridge switch is an NMOS transistor and the low-side bridge switch is also an NMOS transistor.

The drain of the high-side bridge switch UG receives the supply voltage VCC. The gate of the high-side bridge switch UG is electrically connected to the switching control module 120. The source of the high-side bridge switch UG is electrically connected to the drain of the low-side bridge switch LG. The gate of the low-side bridge switch LG receives the pulse width modulation signal PWM, and the source of the low-side bridge switch LG is grounded.

The switching control module 120 receives the pulse width modulation signal PWM output by the PWM signal generator 11, and selectively turns on the high-side bridge switch UG and the low-side bridge switch LG The switching control module 120 comprises a potential shifting unit 1200, an inverter 1201, a current mirror 1202, a sixth transistor M6, a seventh transistor M7 and a current source IS. The potential shifting unit 1200 is electrically connected to the PWM signal generator 11. The inverter 1201 is electrically connected to the output end of the potential shifting unit 1200 and gate of the sixth transistor M6. The current source IS is electrically connected to the output end of the charge pump circuit 10. The sixth transistor M6 is electrically connected to the current source IS and the current mirror 1202. The seventh transistor M7 is electrically connected to the output end of the charge pump circuit 10, the current mirror 1202 and gate of the high-side bridge switch UG, and gate of the seventh transistor M7 is electrically connected to the output end of the potential shifting unit 1200. The current mirror 1202 is electrically connected to the high-side bridge switch UG and the low-side bridge switch LG.

In this embodiment, the sixth transistor M6 and the seventh transistor M7 are both PMOS transistors; however, it is not limited herein. In other embodiments, the sixth transistor M6 and the seventh transistor M7 can also both be NMOS transistors. In other cases, the sixth transistor M6 and the seventh transistor M7 can be the combination of the PMOS transistor and the NMOS transistor.

The potential shifting unit 1200 comprises the proper logic, circuits and/or coding for receiving the voltage provided by the charge pump circuit 10 (for example, VCC+ΔV) and shifting the logic level of the pulse width modulation signal PWM. For instance, the high logic level of the pulse width modulation signal PWM is 5V, and the low logic level of the pulse width modulation signal PWM is 0V. After shifting, the potential shifting unit 1200 outputs a pulse width modulation signal PWM', wherein the high logic level of the pulse width modulation signal PWM' is VCC+5V and the low logic level of the pulse width modulation signal PWM' is VCC.

The current mirror 1202 comprises two NMOS transistors, and the ratio of the current duplication is 1:N. It should be noted that, the structure of the current mirror 1202 is only for illustrating, the user can design the current mirror 1202 depending on need, and it is not limited herein.

To turn on the high-side bridge switch UG, the potential shifting unit 1200 outputs the pulse width modulation signal PWM' at the low logic level, and thus the seventh transistor M7 is turned on. After that, the second capacitor (not shown in FIG. 5) of the charge pump circuit 10 provides voltage to the seventh transistor M7 and turns on the high-side bridge switch UG Moreover, the inverter 1201 converts the pulse width modulation signal PWM' at the low logic level into the new pulse width modulation signal PWM" at the high logic level, and inputs the pulse width modulation signal PWM" at the high logic level to the sixth transistor M6, such that the sixth transistor M6 is turned off.

On the other hand, the low-side bridge switch LG receives the pulse width modulation signal PWM at the low logic level and thus is turned off.

For turning on the low-side bridge switch LG, the low-side bridge switch LG receives the pulse width modulation signal PWM at the high logic level and thus is turned on.

At this moment, the potential shifting unit 1200 outputs a pulse width modulation signal PWM' at the high logic level, and thus the seventh transistor M7 is turned off On the other hand, the inverter 1201 converts the pulse width modulation signal PWM' at the high logic level into the pulse width modulation signal PWM" at the low logic level, and thus the sixth transistor M6 is turned on. After that, the second capacitor of the charge pump circuit 10 provides voltage to the sixth transistor M6. The switching control module 120 controls the current flowing through the sixth transistor M6 via the current source IS, such that the current mirror 1202 receives the current and starts to work. A voltage of the gate of the high-side bridge switch UG drops, and the high-side bridge switch UG is turned off. The switching control module 120 controls the turning on or off of the high-side bridge switch UG, and the low-side bridge switch LG turns on or off based on the pulse width modulation signal PWM directly, and thus the motors can be driven to operate.

According to the above, each time the charge pump circuit 10 can provide enough voltage to the bridge circuit 12. The voltage provided by the second capacitor C2 of the charge pump circuit 10 directly affects the conducting voltages of the high-side bridge switch UG Thus, the high-side bridge switch UG can be fully turned on, and thus the motor 1 can use power effectively.

On the contrary, as the voltage provided by the second capacitor C2 is not enough, the conducting voltages of the high-side bridge switch UG would drop, such that the high-side bridge switch UG cannot be fully turned on, which improves the operating efficiency of the motor 1.

It should be noticed that, the structure of the bridge circuit 12 is for illustrating but not limiting the instant disclosure. Those skilled in the art can adjust the structure of the bridge circuit 12 depending on need.

Figure 7A:
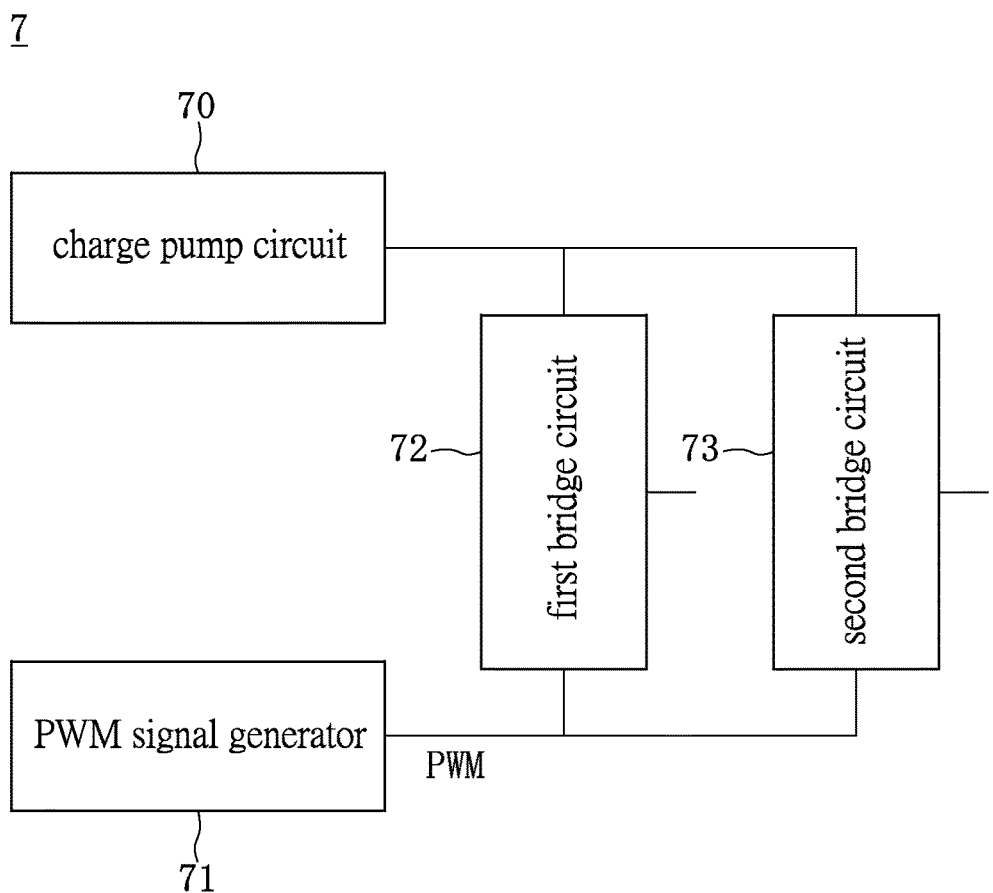
FIGS. 7A~7B show a block diagram of a motor of other embodiments of the instant disclosure.
Figure 7B:
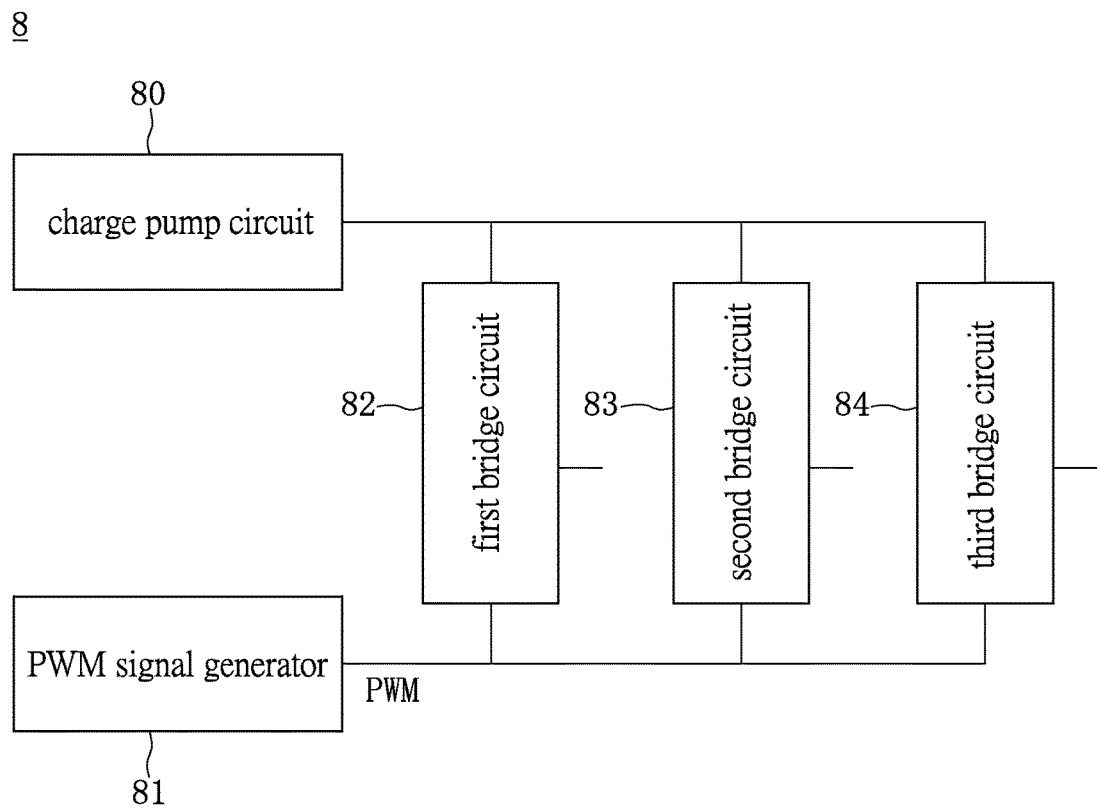

Please refer to FIGS. 7A~7B. FIGS. 7A~7B show a block diagram of a motor of other embodiments of the instant disclosure. The difference between the motors shown in FIG. 2 and FIGS. 7A~7B is that, the motor 7 shown in FIG. 7A is a two-phase motor and the motor 7 shown in FIG. 7B is a three-phase motor.

The motor 7 comprises a charge pump circuit 70, a PWM signal generator 71, a first bridge circuit 72 and a second bridge circuit 73. The first bridge circuit 72 and the second bridge circuit are electrically connected to the charge pump circuit 70 and the PWM signal generator 71 respectively. The structures and the working mechanism of the first bridge circuit 72 and the second bridge circuit 73 are similar to the above mentioned bridge circuit 12, and thus the redundant information is not repeated.

The motor 8 comprises a charge pump circuit 80, a PWM signal generator 81, a first bridge circuit 82, a second bridge circuit 83 and a third bridge circuit 84. The first bridge circuit 82, the second bridge circuit 83 and the third bridge circuit 84 are electrically connected to the charge pump circuit 80 and the PWM signal generator 81 respectively. The structures and the working mechanism of the first bridge circuit 82, the second bridge circuit 83 and the third bridge circuit 84 are similar to the above mentioned bridge circuit 12, and thus the redundant information is not repeated.

The operating processes of the motors 7 and 8 are similar to the above mentioned motor 1. The charge pump circuits 70 and 80 provide stable and enough voltages to each bridge circuit, and these bridge circuits turn on their high-side bridge switch and the low-side bridge switch according to the pulse width modulation signal PWM, such that the polarities of the motor rotators (not shown in FIGS. 7 and 8) of the motors 7 and 8 change.

In addition, the two-phase motor and the three-phase motor are taken for examples in these embodiments, but it is not limited herein. Those skilled in the art can adjust the phase number of the motor 1 depending on need and reach the above mentioned results by referring to the above description.

To sum up, the charge pump circuit and the motor using the same provided by the instant disclosure provides a stable voltage to the bridge circuit, such that the high-side bridge switch and the low-side bridge switch can be entirely turned on. Moreover, the charge pump circuit comprises a plurality of low-voltage elements, and the area of the charge pump circuit can be decreased. Also, switching noises generated by the charge pump circuit within the switching process can be reduced such that the operating efficiency of the motor can be raised.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A charge pump circuit, comprising:
    an input voltage module, providing an input voltage; and
    a switching transistor module, electrically connected to a first capacitor, a second capacitor and the input voltage module, receiving a supply voltage and the input voltage and charging the first capacitor and the second capacitor, wherein the switching transistor module comprises a plurality of low-voltage elements and there is a voltage difference between the supply voltage and the input voltage;
    wherein the switching transistor module charges the first capacitor within a first charging period such that a voltage across the first capacitor is the supply voltage, the switching transistor module charges the second capacitor within a second charging period such that a voltage across the second capacitor is the sum of the supply voltage and the voltage difference;
    wherein the frequency of charging the second capacitor via the switching transistor module is higher than the frequency of discharging a bridge circuit via the second capacitor, and a high-side bridge switch of the bridge circuit is an NMOS transistor.

2. The charge pump circuit according to claim 1, wherein the switching transistor module comprises:
    a first transistor, electrically connected to a first end of the first capacitor, and the first transistor receiving the supply voltage;

a second transistor, electrically connected to a first end of the first capacitor and the input voltage module;
a third transistor, electrically connected to a second end of the first capacitor, and the third transistor receiving the supply voltage; and
a fourth transistor, electrically connected to first ends of the second capacitor and the third transistor, and a second end of the second capacitor grounded.

3. The charge pump circuit according to claim 2, wherein the first transistor and the fourth transistor are turned off and the second transistor and the third transistor are turned on within the first charging period, and a first current flows to the second transistor via the third transistor and the first capacitor such that a voltage across the first capacitor is the voltage difference between the supply voltage and the input voltage.

4. The charge pump circuit according to claim 2, wherein the first transistor and the fourth transistor are turned on and the second transistor and the third transistor are turned off within the second charging period, and a second current flows to the fourth transistor via the first transistor and the first capacitor such that a voltage across the second capacitor is the sum of the supply voltage and the voltage difference.

5. The charge pump circuit according to claim 2, wherein the first transistor and the fourth transistor are PMOS transistors and the second transistor and the third transistor are NMOS transistors.

6. The charge pump circuit according to claim 1, wherein the input voltage module comprises:
a source follower; and
a fifth transistor, electrically coupled to the source follower and the second transistor, to provide the input voltage to the switching transistor module.

7. The charge pump circuit according to claim 1, wherein the frequency of charging the second capacitor via the switching transistor module is higher than the frequency of discharging the bridge circuit via the second capacitor, so the voltage provided by the second capacitor to the bridge circuit maintains as the sum of the bridge circuit and the voltage difference such that the high-side bridge switch of the bridge circuit is fully turned on.

8. The charge pump circuit according to claim 1, wherein the switching transistor module comprises the low-voltage elements, so the noise generated during the operation process is reduced.

9. A motor, comprising:
a charge pump circuit, comprising:
an input voltage module, providing an input voltage; and
a switching transistor module, electrically connected to a first capacitor, a second capacitor and the input voltage module, receiving a supply voltage and the input voltage, and charging the first capacitor and the second capacitor, wherein the switching transistor module comprises a plurality of low-voltage elements and there is a voltage difference between the supply voltage and the input voltage;
at least one bridge circuit, electrically connected to the charge pump circuit, the bridge circuit comprising a high-side bridge switch, wherein the high-side bridge switch is an NMOS transistor;
wherein the switching transistor module charges the first capacitor within a first charging period such that a voltage across the first capacitor is the supply voltage, the switching transistor module charges the second capacitor within a second charging period such that a voltage across the second capacitor is the sum of the supply voltage and the voltage difference;
wherein the frequency of charging the second capacitor via the switching transistor module is higher than the frequency of discharging a bridge circuit via the second capacitor, and a high-side bridge switch of the bridge circuit is an NMOS transistor.

10. The motor according to claim 9, wherein the bridge circuit further comprises:
a low-side bridge switch, electrically connected to the high-side bridge switch, wherein the turning on or off of the high-side bridge switch and the low-side bridge switch is related to an operating status of the motor; and
a switching control module, electrically connected to the charge pump circuit, the high-side bridge switch and the low-side bridge switch, to selectively turn on the high-side bridge switch and the low-side bridge switch.

11. The motor according to claim 9, wherein the switching transistor module comprises:
a first transistor, electrically connected to a first end of the first capacitor, and the first transistor receiving the supply voltage;
a second transistor, electrically connected to a first end of the first capacitor and the input voltage module;
a third transistor, electrically connected to a second end of the first capacitor, and the third transistor receiving the supply voltage; and
a fourth transistor, electrically connected to first ends of the second capacitor and the third transistor, and a second end of the second capacitor grounded.

12. The motor according to claim 11, wherein the first transistor and the fourth transistor are turned off and the second transistor and the third transistor are turned on within the first charging period, and a first current flows to the second transistor via the third transistor and the first capacitor such that a voltage across the first capacitor is the voltage difference between the supply voltage and the input voltage.

13. The motor according to claim 11, wherein the first transistor and the fourth transistor are turned on and the second transistor and the third transistor are turned off within the second charging period, and a second current flows to the fourth transistor via the first transistor and the first capacitor such that a voltage across the second capacitor is the sum of the supply voltage and the voltage difference.

14. The motor according to claim 11, wherein the first transistor and the fourth transistor are PMOS transistors and the second transistor and the third transistor are NMOS transistors.

15. The motor according to claim 9, wherein the input voltage module comprises:
a source follower; and
a fifth transistor, electrically coupled to the source follower and the second transistor, to provide the input voltage to the switching transistor module.

16. The motor according to claim 9, wherein the frequency of charging the second capacitor via the switching transistor module is higher than the frequency of discharging the bridge circuit via the second capacitor, so the voltage provided by the second capacitor to the bridge circuit maintains as the sum of the bridge circuit and the voltage difference such that the high-side bridge switch of the bridge circuit is fully turned on.

17. The motor according to claim 9, wherein the switching transistor module comprises the low-voltage elements, so the noise generated during the operation process is reduced.

* * * * *